(12) United States Patent  (10) Patent No.: US 8,630,445 B2
McCarthy et al.  (45) Date of Patent: Jan. 14, 2014

(54) HIDDEN IMAGE METHOD AND HIDDEN IMAGE APPARATUS

(75) Inventors: Lawrence David McCarthy, Noble Park North (AU); Matthew John Ballard, Glen Waverley (AU)

(73) Assignee: Commonwealth Scientific And Industrial Research Organisation, Australia Capital Territory (AU)

( * ) Notice: Subject to any disclaimer, the term of this patent is extended or adjusted under 35 U.S.C. 154(b) by 316 days.

(21) Appl. No.: 12/936,124

(22) PCT Filed: Apr. 2, 2009

(86) PCT No.: PCT/AU2009/000406
§ 371 (c)(1),
(2), (4) Date: Dec. 20, 2010

(87) PCT Pub. No.: WO2009/121141
PCT Pub. Date: Oct. 8, 2009

(65) Prior Publication Data
US 2011/0150361 A1   Jun. 23, 2011

(30) Foreign Application Priority Data
Apr. 3, 2008 (AU) ................... 2008901600

(51) Int. Cl.
*G06K 9/00* (2006.01)
(52) U.S. Cl.
USPC .......................................... 382/100; 713/176
(58) Field of Classification Search
USPC ............ 382/100, 232; 380/210, 252, 287, 54;
713/176; 704/200.1, 273; 381/73.1;
348/460, 463
See application file for complete search history.

(56) References Cited

U.S. PATENT DOCUMENTS 4,143,967 A    3/1979  Wicker ............................ 355/77
5,374,976 A  * 12/1994  Spannenburg ................ 399/366
(Continued)

FOREIGN PATENT DOCUMENTS

| CA | 1066109 | 11/1979 |
| CA | 1172282 | 8/1984 |
| EP | 1 714246 B1 | 1/2008 |
| WO | WO91/11331 | 8/1991 |
| WO | WO03/013870 A2 | 2/2003 |
| WO | WO2004/110773 A1 | 12/2004 |
| WO | WO 2007/131215 A2 | 11/2007 |

*Primary Examiner* — Anand Bhatnagar
(74) *Attorney, Agent, or Firm* — Ladas & Parry, LLP

(57) ABSTRACT

A hidden image method comprising forming a set of carrier devices which when overlayed upon one another and aligned will reveal N images within a common area, the set of carrier devices being formed by: forming N latent images from respective ones of the N images and respective ones of N line decoders to hide the N images, each latent image being decodeable by the decoder from which the latent image is formed to reveal the image the latent image hides, the N latent images further formed such that the lines of the decoders cross one another within the common area at line angles displaced relative to one another so as to define a single axis of alignment; and forming each carrier device of the set of carrier devices by combining at least two items selected from the set of latent images and decoders so as not to decode any of the hidden images and such that the set of carrier devices includes all the latent images and all the decoders, whereby the set of carrier devices will reveal the N hidden images within the common area when overlayed upon one another and aligned. Also disclosed are a line decoder comprising a plurality of lines which diverge from one another, a line decoder comprising a plurality of lines at least some of which have an increasing average width from one end to another, a line decoder comprising at least some lines having non-integer line widths.

18 Claims, 13 Drawing Sheets

(56) References Cited

U.S. PATENT DOCUMENTS

| | | | |
|---|---|---|---|
| 5,708,717 A * | 1/1998 | Alasia | 380/51 |
| 5,784,200 A | 7/1998 | Modegi | 359/567 |
| 6,104,812 A * | 8/2000 | Koltai et al. | 380/51 |
| 6,859,534 B1 * | 2/2005 | Alasia | 380/51 |
| 7,114,750 B1 * | 10/2006 | Alasia et al. | 283/72 |
| 7,466,876 B2 * | 12/2008 | Alasia | 382/294 |
| 8,199,913 B2 * | 6/2012 | Alasia et al. | 380/54 |
| 2005/0123134 A1 * | 6/2005 | Alasia | 380/54 |
| 2009/0128858 A1 * | 5/2009 | Kiuchi et al. | 358/3.28 |

* cited by examiner

Figure 4A
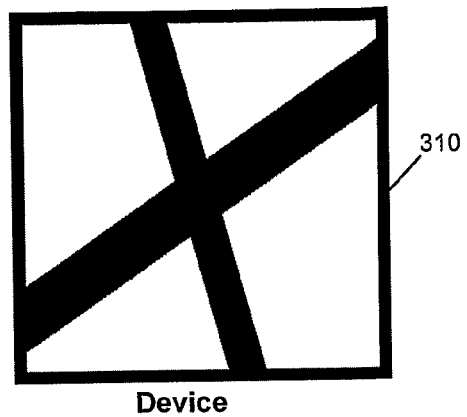
Device
Figure 4B
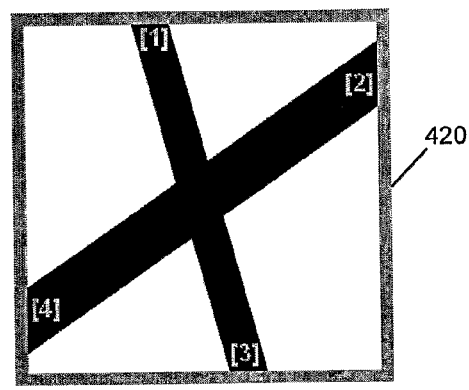
Screen
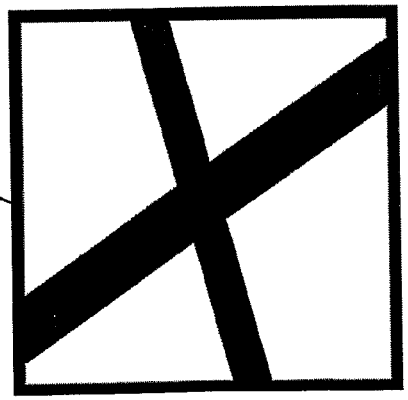
Device
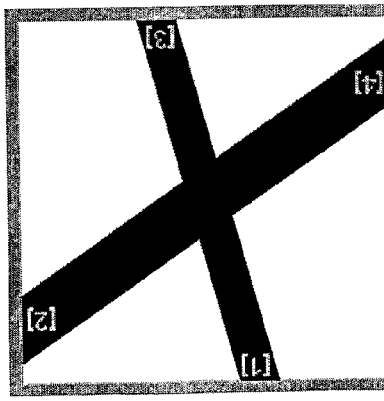
Screen
Figure 4C

HIDDEN IMAGE METHOD AND HIDDEN IMAGE APPARATUS

CROSS-REFERENCE TO RELATED APPLICATIONS

This application is the U.S. National Stage of International Patent Application No. PCT/AU2009/000406 filed on Apr. 2, 2009, which claims priority to Australian Patent Application Number 2008901600 on Apr. 3, 2008 the disclosures of which is hereby incorporated by reference in its entirety.

FIELD

The present invention relates to a hidden image method, a hidden image apparatus and to line decoders.

BACKGROUND TO THE INVENTION

In order to authenticate and verify the originality of, and to prevent unauthorised duplication or alteration of documents such as banknotes, credit cards and the like, security devices are often incorporated. The security devices are designed to provide some proof of authenticity and deter copying. Despite the wide variety of techniques that are available, there is always a need for further techniques which can be applied to provide a security device.

A variety of techniques have been developed to conceal latent images within security documents and instruments. Perhaps the earliest such technique is the Watermark. In this approach, a latent image is provided on a paper substrate such that the image is invisible when the paper is viewed in reflection, but visible when it is viewed in transmission.

More recent means of concealing images for security applications include the technique known as "Scrambled Indicia" and described in analogue form in U.S. Pat. No. 3,937,565 and in a computerized, digital version in WO 97/20298. In the latter technique, the computer program effectively slices the image to be hidden into parallel slivers called "input slices". These are then scrambled, generating a series of thinner "output slices" that are incorporated into an image in a form that is incoherent to the human eye. When viewed through a special device containing many microscopically small lenses, the original image is, however, reconstituted, thereby rendering the hidden image visible.

Scrambled images of this type may be incorporated into a visible background picture by adjusting the thickness of the features in the scrambled images.

WO 97/20298 also describes how the scrambled images may be routinely incorporated into a visible picture by a computer algorithm. An original image is digitised and separated into its cyan, magenta, yellow, and black components. One or more scrambled images are then incorporated into the cyan and magenta separations. These are substituted for the originals and the job is printed as normal.

A variety of patents also describe the concealment of latent images by "modulation" of the line- or dot patterns used to print images. In order to print an image, professional printers use a variety of so-called "screening" techniques. Some of these include round stochastic line and elliptical-screens. Examples of these screens are shown in U.S. Pat. No. 6,104,812. Essentially, the picture is broken up into a series of image elements, which are typically dots or lines of various shapes and combinations. These dots and lines are usually extremely small, being much smaller than the human eye can perceive. Thus, images printed using such screens appear to the eye to have a continuous tone or density.

Hidden images can be created by juxtaposing two apparently similar line or dot screens with one another. Processes in which an image is hidden by changing the position, shape, or orientation of the line elements used in printing screens are formally known as "line modulation". Processes in which the dots in a printer's screens are deformed or moved to conceal an image are known as "dot modulation".

It would be desirable to provide other techniques for concealing images and/or to provide decoders with improved security.

SUMMARY OF THE INVENTION

In a first aspect the invention provides hidden image method comprising forming a set of carrier devices which when overlayed upon one another and aligned will reveal N images within a common area, the set of carrier devices being formed by:

forming N latent images from respective ones of the N images and respective ones of N line decoders to hide the N images, each latent image being decodeable by the decoder from which the latent image is formed to reveal the image the latent image hides, the N latent images further formed such that the lines of the decoders cross one another within the common area at line angles displaced relative to one another so as to define a single axis of alignment; and forming each carrier device of the set of carrier devices by combining at least two items selected from the set of latent images and decoders so as not to decode any of the hidden images and such that the set of carrier devices includes all the latent images and all the decoders, whereby the set of carrier devices will reveal the N hidden images within the common area when overlayed upon one another and aligned.

In an embodiment, each line decoder has an average line width sufficiently different to the line widths of each other decoder so as to decode a single one of the hidden images.

In an embodiment the hidden image method comprises forming each carrier device by combining at least one latent image and at least one decoder.

In an embodiment each carrier device consists of one latent image and one decoder.

In an embodiment each line of at least one decoder is at the same angle relative to the common area.

In an embodiment at least some lines of at least one decoder are different angles relative to the common area.

In an embodiment at least some lines of at least one decoder vary in width.

In an embodiment the lines of at least one decoder are of constant width.

In an embodiment N is 2.

In an embodiment the method comprises selecting the hidden images so as to define a single correct orientation relative to the axis of alignment when the hidden images are revealed by decoding.

In an embodiment at least one of the carrier devices carries a further hidden image arranged so as to decode when the carrier devices are in register such that each of the hidden images and the further hidden image are concurrently revealed.

In an embodiment the further hidden image is formed by modifying corresponding portions of two carrier devices.

In an embodiment the portions are modified by modifying at least one parameter of the image carriers.

In an embodiment the modified parameter is one or more of:

line width;
line angle;
line phase; and
function as image carrier or image decoder.

In an embodiment at least one of the decoders has a line width which is a non-integer number of pixels.

In a second aspect, the invention provides a hidden image apparatus comprising:
a set of carrier devices which when overlayed upon one another will reveal N images within a common area, the set of carrier devices being formed by:
forming N latent images from respective ones of the N images and respective ones of N line decoders, each latent image being decodeable by the decoder from which it is formed to reveal the hidden image, the lines of the decoders crossing one another at relative line angles so as to define a single axis of alignment within the common area; and
forming each carrier device of the set of carrier devices by combining at least two items selected from the set of latent images and decoders so as not to decode any of the hidden images and such that the set of carrier devices include all the latent images and all the decoders between them, whereby the set of carrier devices will decode all the hidden images when aligned.

In a third aspect, the invention provides a hidden image method comprising:
forming a set of carrier devices from N line decoders and N latent images, each latent image encoding an image which is hidden until revealed by the corresponding line decoder, the latent images and line decoders being complementary such that each of the images may be simultaneously decoded; and
incorporating a further latent image within at least one of the carriers to encode a further image such that when the image carriers are in register each of the latent images and the further latent image are concurrently decoded.

In a fourth aspect, the invention provides a hidden image apparatus comprising:
a set of carrier devices formed from N line decoders and N latent images, each latent image encoding an image which is hidden until revealed by a corresponding line decoder, the plurality of latent images and line decoders being complementary such that each of the images may be simultaneously decoded, and at least one of the carriers incorporating a further latent image within which is encoded a further image such that when the image carriers are in register each of the images and the further image are concurrently decoded.

In a fifth aspect, the invention provides a line decoder comprising at least some lines having non-integer line widths.

In an embodiment, at least some lines having non-integer line widths.

In an embodiment all the lines have non-integer line widths.

In a sixth aspect, the invention provides a line decoder comprising a plurality of lines, at least some of which are varied in at least one line characteristic selected from the group comprising line width, line angle, line phase, and mark space ratio along a plurality of sub-portions of the line, and wherein sub-portions of the varied lines have substantially the same average line characteristic.

In a seventh aspect, the invention provides a method of improving security of a line decoder comprising modifying lines of a line decoder having a line characteristic selected from the group comprising line width, line angle, line phase, and mark space ratio along a plurality of sub-portions of the line, while the sub-portions of the varied lines have substantially the same average line characteristic.

In an eighth aspect, the invention provides a line decoder comprising a plurality of lines which diverge from one another.

In an embodiment the lines diverge from one another by increasing in width.

In a ninth aspect, the invention provides a line decoder comprising a plurality of lines at least some of which have an increasing average width from one end to another.

In an embodiment the line width of the plurality of lines having an increasing average width increases in substantially the same direction of travel along the lines.

In an embodiment the line width of at least some of the lines have an increasing average width increases in a first direction of travel along the lines and the average line width of some other lines increases in a second direction of travel.

In an embodiment the line decoder comprises opaque and clear or white lines, the opaque lines of the decoder increase in width while the clear or white lines are constant in width.

BRIEF DESCRIPTION OF THE DRAWINGS

FIGS. 4A to 4C illustrates effects of screens and devices.

DETAILED DESCRIPTION

Figure 1:
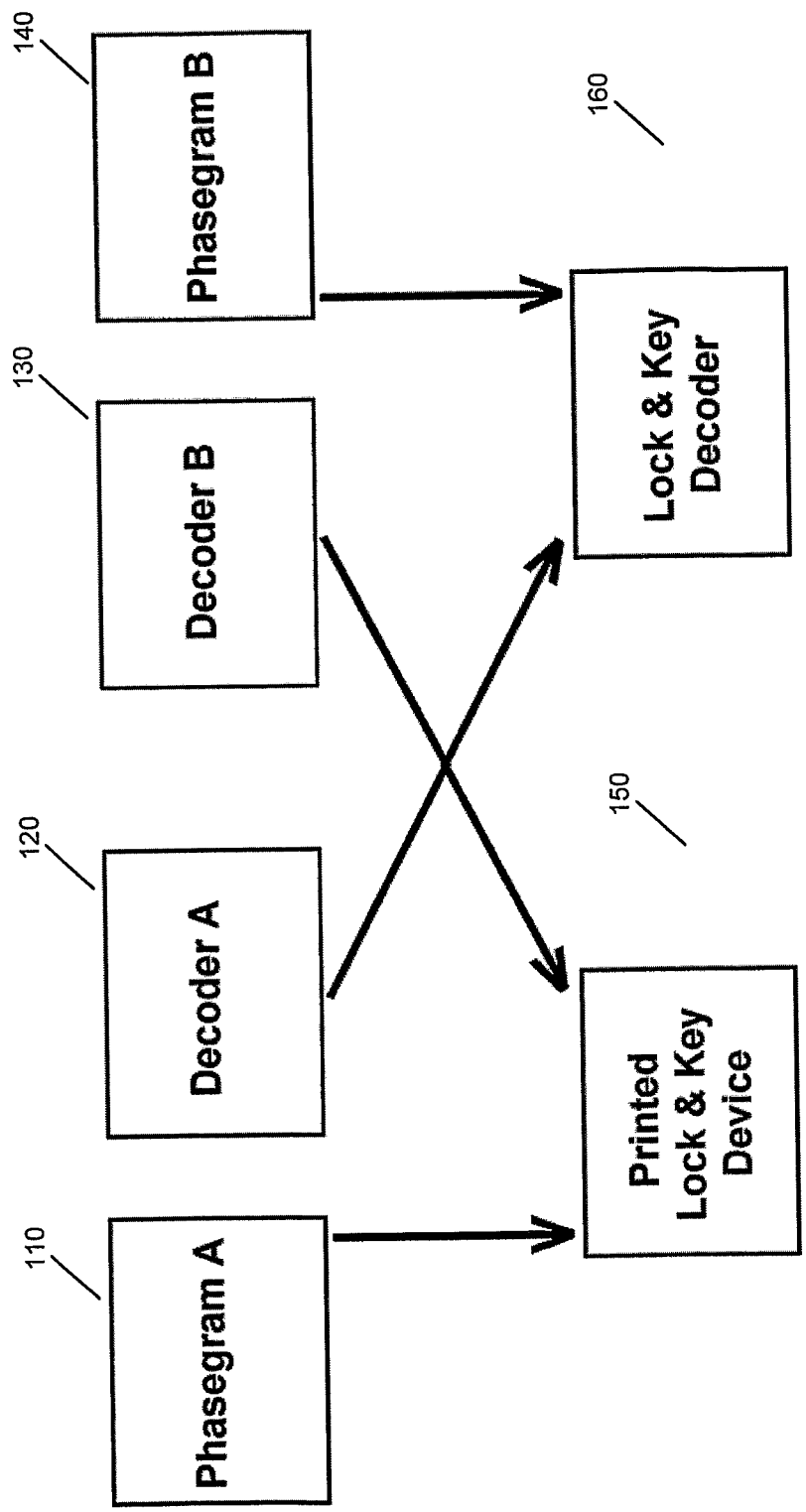
FIG. 1 illustrates forming a cross-combination.

The embodiments provide hidden image techniques. In one embodiment, a set of carrier devices is formed, the set of carrier devices have a plurality of latent images (each formed from a line decoder) and each of the line decoders such that all images will decode but none of the individual carriers decode an image. That is, there is a cross-combination of line decoders and latent images.

Persons skilled in the art will appreciate that computer program code may be used to carry out the techniques described below, either by carrying out the steps or requiring a user to input information, such as a selection of a host or latent image into the system. Such program code can be provided on a disc or supplied to users in other ways such as by download over the Internet.

Latent Images

The embodiment relates to latent images that employ line decoders, also known as line screens or masks. Existing line decoders are typically formed of a plurality of parallel dark and transparent lines as the decoders are designed to overlay a latent image to decode the image hidden within the latent image. However, the roles may be reversed, by overlaying a latent image that includes transparent portions on a decoder having dark and white portions and in some embodiments, both the decoder and the latent image have transparent portions. Herein, it will be understood that the term "white" can include "transparent" unless the context implies otherwise.

An example of a process for producing a latent image that is suitable for use is the processes for producing a PhaseGram described in WO2005002880-A1.

In PhaseGram, multiple images, such as photographic portraits, are digitized and then separated into their various grey-scales or colour hue saturations. Line screens with various displacements are then overlaid in the black areas of each of these separations, with the line screens displaced according to the grey scale or hue saturation of the separation. The adjusted images are then combined to create a new printing screen. All of this is done in a digital process by a computerised version of the algorithm. The use of a digital computer method allows for variations in the construction and final presentation of the hidden image that are not possible using a comparable analogue (photographic) process. The new printing screens are extremely complex, defying human observation of the hidden image(s) even at full magnification.

BinaGram is similar in concept to PhaseGram, involving as it does a computer algorithm to generate a new printing screen. In this case however, the fundamental principle used is not that of displaced line screens, but rather the principle of compensation in which each element of the hidden image is paired with a new element of complementary density.

Persons skilled in the art will appreciate that other latent image techniques can be used. The particular suitability of such techniques will vary depending on what effects are desired to be achieved and there compatibility with the hidden image techniques described below. Persons skilled in the are can readily ascertain their suitability.

One example, "Scrambled Indicia" are described in analogue form in U.S. Pat. No. 3,937,565 and in a computerized, digital version in Patent WO 97/20298. In the latter technique, the computer program effectively slices the image to be hidden into parallel slivers called "input slices". These are then scrambled, generating a series of thinner "output slices" that are incorporated into an image in a form that is incoherent to the human eye. When viewed through a special device containing many microscopically small lenses, the original image is, however, reconstituted, thereby rendering the hidden image visible.

Scrambled images of this type may be incorporated into a visible background picture by matching the grey-scale or colour saturation of the hidden image to the background picture. This is achieved by adjusting the thickness of the features in the scrambled images to suit.

Latent images may also be formed by "modulation" of the line- or dot patterns used to print images. In order to print an image, professional printers use a variety of so-called "screening" techniques. Some of these include round stochastic line and elliptical-screens. Examples of these screens are shown in U.S. Pat. No. 6,104,812. Essentially, the picture is broken up into a series of image elements, which are typically dots or lines of various shapes and combinations. These dots and lines are usually extremely small, being much smaller than the human eye can perceive. Thus, images printed using such screens appear to the eye to have a continuous tone or density.

Hidden images can be created by juxtaposing two apparently similar line with one another. Processes in which an image is hidden by changing the position, shape, or orientation of the line elements used in printing screens are formally known as "line modulation". The theory of line (and dot) modulation is described by Amidror (Issac Amidror, "The Theory of the Moiré Phenomenon", Kluwer Academic Publishers, Dordrecht, 2000, pages 185-187). When two locally periodic structures of identical periodicity are superimposed upon each other, the microstructure of the resulting image may be altered (without generation of a formal Moiré pattern) in areas where the two periodic structures display an angle difference of $\alpha=0°$. The extent of the alteration in the microstructure can be used to generate latent images which are clearly visible to an observer only when the locally periodic structures are cooperatively superimposed. Thus, the latent images can only be observed when they are superimposed upon a corresponding, non-modulated structure. Accordingly, a modulated image can be incorporated in an original document and a decoding screen corresponding to the non-modulated structure used to check that the document is an original—e.g. by overlaying a modulated image with a non-modulated decoding screen to reveal the latent image.

Examples of concealing latent images using line modulations are described in various patents, including the following: U.S. Pat. No. 6,104,812, U.S. Pat. No. 5,374,976, CA 1,066,109, CA 1,172,282, WO03/013870-A2, U.S. Pat. No. 4,143,967, WO91/11331, and WO2004/110773 A1. One such technique, known as Screen Angle Modulation, "μ-SAM", or its micro-equivalent, "g-SAM", is described in detail in U.S. Pat. No. 5,374,976 and by Sybrand Spannenberg in Chapter 8 of the book "Optical Document Security, Second Edition" (Editor: Rudolph L. van Renesse, Artech House, London, 1998, pages 169-199), both incorporated herein by reference. In this technique, latent images are created within a pattern of periodically arranged, miniature short-line segments by modulating their angles relative to each other, either continuously or in a clipped fashion. While the pattern appears as a uniformly intermediate colour or grey-scale when viewed macroscopically, a latent image is observed when it is overlaid with an identical, non-modulated pattern on a transparent substrate.

Further security enhancements may include using colour inks which are only available to the producers of genuine bank notes or other security documents, the use of fluorescent inks or embedding the images within patterned grids or shapes.

The methods of embodiments of the invention can be used to produce security devices to thereby increase security in anti-counterfeiting capabilities of items such as tickets, passports, licences, currency, and postal media. Other useful applications may include credit cards, photo identification cards, tickets, negotiable instruments, bank cheques, traveller's cheques, labels for clothing, drugs, alcohol, video tapes or the like, birth certificates, vehicle registration cards, land deed titles and visas.

Typically, the security device will be provided by embedding the securitized image within one of the foregoing documents or instruments and separately providing a decoding screen or screens. However, the securitized image could be carried by one end of a banknote while the decoding screen is carried by the other end to allow for verification that the note is not counterfeit.

Forming Cross-Combinations

In one embodiment, the hidden image method involves forming carrier devices which will reveal more than one image when aligned by forming cross-combinations of latent images and decoders.

Such a hidden image apparatus is a cross combination of two or more single hidden image devices to generate at least a pair of images each containing a combination of decoder screens and hidden image devices.

Two Latent Image Case

The simplest case is the preparation of two conventional latent images, using a latent image techniques such as a phasegram, formed from decoder screens with different line angles and cross-combining them as shown in FIG. 1.

Two images A and B are processed to produce two pairs of phasegrams and decoder screens, namely Phasegram A 110 and Decoder A 120 [PA, DA] and Phasegram B 140 and Decoder B 130 [PB, DB]. By cross-combination PA 110 and DB 130 are combined to produce one image, PADB 150. Similarly DA 120 and PB 140 are combined to produce another image, PBDA. The two images are now a pair [PADB, PBDA]. When reduced to physical form such that they can be used as a hidden image apparatus, the pair of images are termed a pair of carrier devices PADB 150 and PBDA 160. We also term such devices lock and key (L&K) devices as they contain both something to be decoded and something that decodes so perform analogous functions to both a lock and a key. To enable them to act as a hidden image apparatus one or both of PADB 150 and PBDA 160 are printed on a transparent substrate. In this example, PBDA 160 is printed on a transparent substrate such that it acts as a decoder whereas PADB 150 is printed on a non-transparent substrate.

If decoder A 120 is printed on a transparent substrate and placed on PADB 150 will decode Phasegram A 110 such that image A will appear as for a normal phasegram but decoder B 130 will produce only moiré patterns with the printed device 150. Similarly if decoder B 130 is placed on PBDA 160, image B will appear whereas decoder A 120 will produce only moiré patterns.

When the PBDA 160 decoder screen is used to decode the PADB 150 device both image A and image B appear, this decoding has several useful corollaries discussed below.

It is important to note here that when producing such a hidden image apparatus there is no intrinsic design factor that constrains any of the component image combinations such that one image must be the decoder screen and the images are functionally interchangeable. The specific images though may define a role as to which image is the 'lock' and which image is the 'key' to suit a particular application.

This is somewhat different to a conventional device, such as a phasegram device, wherein even though the decoder screen artwork and the phasegram device are similarly functionally interchangeable, the ability of the decoder screen to decode other phasegram devices with the same line widths constrains its use to that of decoder in security applications.

To produce a hidden image apparatus the component images can be combined using a number of techniques known to those in the art. These include mathematical operations; weighted averaging or other process to derive an arithmetical mean; or Boolean logic operations e.g. AND, OR, NOR etc. It is not a requirement within a single hidden image apparatus to restrict combination techniques to a single method.

In physical form the carrier devices can be reproduced by printing, projection, electronic display or any other process that will provide a means to provide interaction of the images 150,160 to permit decoding to occur. In the simplest instance for a two image hidden image apparatus, one image could be printed on paper and one on a transparency. When the transparency is physically superimposed on the printed image, the transparency screen decodes the relevant hidden image on the paper and the screen on the paper decodes the relevant image hidden in the screen, so physically separated hidden images become visible simultaneously when combined. Moreover it is not apparent to the user that the separate images are produced from either the paper or the screen so when the decoding screen is moved across the printed image it appears that the images are moving with respect to each other on the printed surface.

In embodiments where the hidden image apparatus is constructed from hidden image technology involving line screen decoders, the images and screens will be defined by a characteristic angle and line width, frequency or period. The line angle is conventionally defined by a clockwise rotation from the vertical axis of the hidden images and can be positive or negative.

In the preferred embodiment, each of the images of the image carriers has a visible frame of reference such as a line, border or clearly defined edge to provide the individual doing the decoding with a visual cue to allow the correct alignment of the decoding screen. The need to rotate the screen with respect to the device is usually perplexing though not insurmountable. To achieve this assisted alignment, the line angles of the decoders use the visible frame of reference as a common reference frame. This typically ensures that decoding occurs when the edges are parallel; this is a natural expectation of individuals when decoding. Nevertheless special applications or variations may take advantage of rotations to achieve a particular advantage.

It is usually advantageous to have the component images related in some way and with an obvious correct orientation. For example:
1. An image of a padlock and an image of a key; the key image might be a clear silhouette of the key image that precisely fits the padlock.
2. An image of a mountain with a tunnel and an image of a train; the train needs to have its wheels on the track to enter the tunnel the correct way.
3. An image of a word such as a company name with the component letters divided alternately between two or more images.

There have to be at least two components combined in the L&K device and at least two components combined in the decoder but they could consist of any number of decoding screens and hidden image devices. A practical component of an L&K system could be made by combining only screens or by combining only phasegrams for specialised purposes.

Extending to more Latent Images and Limitations.

Persons skilled in the art will appreciate that the technique can be extended to incorporate more images and more carrier devices.

When the number of images used in a hidden image apparatus exceeds two, many more combinations of devices and decoders are possible. This permits various image combinations to appear with various combinations of individual decoders and individual devices. There are limits to the range of combinations possible, specifically a hidden image cannot be combined with its own decoder otherwise it would be decoded.

In the following discussion M is an abbreviation for a latent image encoded with a decoder D. In the case of four latent images (M1-M4) it is possible to combine them with the line decoders (D1-D4) to form the image carriers: M1D2, M2D1, M3D4, M4D3; which results in two pairs (M1D2, M2D1) & (M3D4, M4D3) which will each decode 2 images. It is also possible to produce M1D2, M2D3, M3D4, M4D1; in which case you have four pairs (M1D2, M4D1), (M1D2, M2D3), (M2D3, M3D4), (M3D4, M4D1) each of which will decode one image such that all of them must be combined to decode all the images.

In an example of three images it is possible to form different image carriers, for example: M1D2, M2M3, D1D3 and M1M2D3, M2M3D1, D1D3M2 or M1M2D3, D1D2M3 which could be used in practice by supplying D1M3 as a lower level of check than D1D2M3 as M2 is not decoded by D1M3.

There are some limitations as a requirement is that the screens and/or images have to be able to be combined without complete loss of performance which will, in effect, put a cap on the number of carrier devices that can be formed in one hidden image apparatus.

Persons skilled in the art will also understand that certain line angle combinations may produce undesired effects, and for a security device it will usually be desirable that the line widths of the component MDIs differ.

The hidden images and decoding screens involved could derived from technologies like phasegrams, binagrams or other similar MDI devices wherein the image is disclosed or activated by a unique decoding screen and inherently a number of different screens exist.

Screen Orientation Effects

For a typical L&K device a different line angle is used to make each of the component latent images. As there are at least two different line angles involved in the construction of an L&K device the contributing lines will cross. In fact if the lines are at angle A and B then the angle between the lines is A−B.

For example if we consider two sets of phasegram lines with the angle A is 55° and angle B is −15° and line A is 50% wider than B. These sets are related to each other by the grid 200 or lattice of lines shown in FIG. 2.

Figure 2:
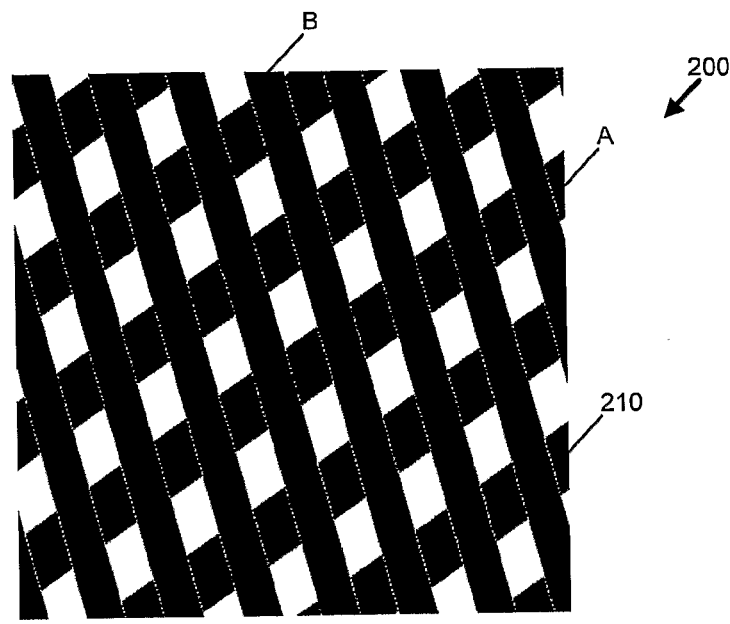
FIG. 2 shows an exemplary portion of two crossing line screens.
Figure 3:
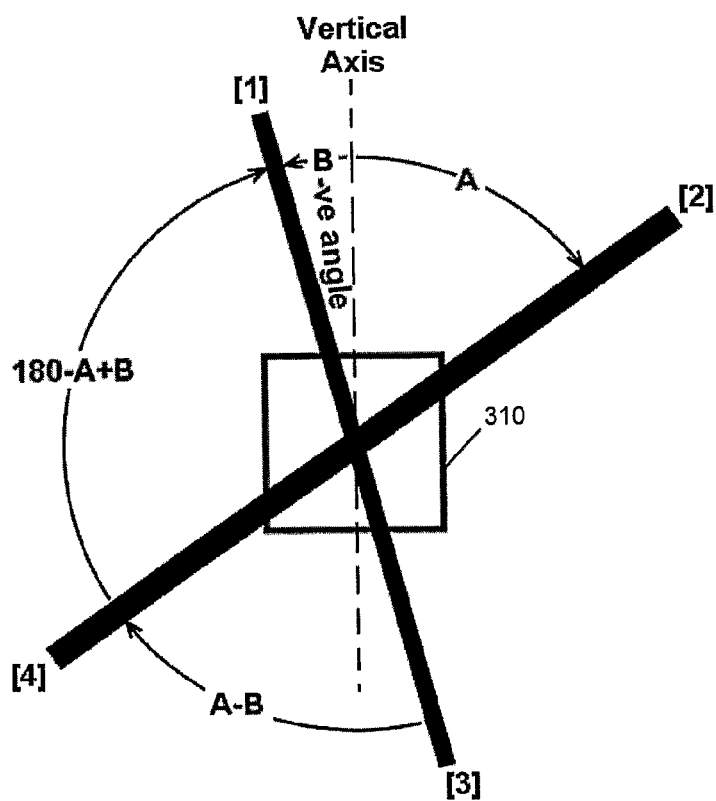
FIG. 3 illustrates relative line angle.

In the case of FIG. 2 the reference axis 210 is the vertical axis running parallel to the right or left side of the rectangular design. FIG. 3A shows just two of these lines, one from each phasegram set.

In this example, angle A of line [1] [3] is 55° and angle B of line [2] [4] is −15°, therefore one of the angles between the lines is A−B=55−(−15)=70°, the other angle is 180−A+B=180−55+(−15)=110°.

The section of this image contained in the square 310 is shown in FIG. 4A.

And consider this as a section of a printed L&K device; if we superimpose on it an identical section of a decoding screen 420 as shown in FIG. 4B. Correct decoding will occur on alignment because all the line angles and widths are coincident.

Consider the screen 420 rotated through 180° to produce revised screen 421 as shown in FIG. 4C.

Again decoding will occur but the hidden image on the decoding screen will now be inverted and if chosen to do so will have an obviously wrong relationship with the hidden image on the device.

Figure 5A:
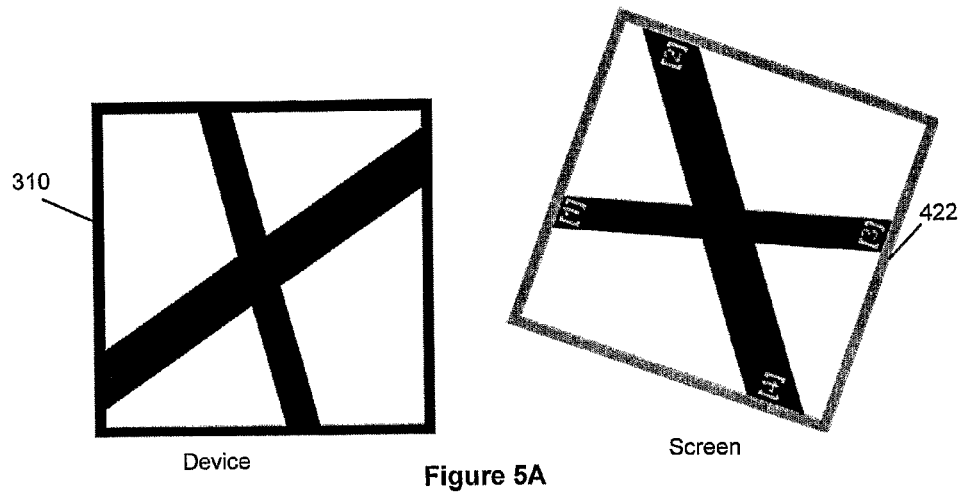
FIGS. 5A to 5G illustrates effects of attempting to decode with related screens.

Rotation of the screen 422 to other screen rotation angles will only produce moiré patterns. Even angles such as B−A=(−15)−55=−70° that bring line [2] [4] to the same angle as [1] [3] will not provide any decoding as illustrated in FIG. 5A.

Figure 5B:
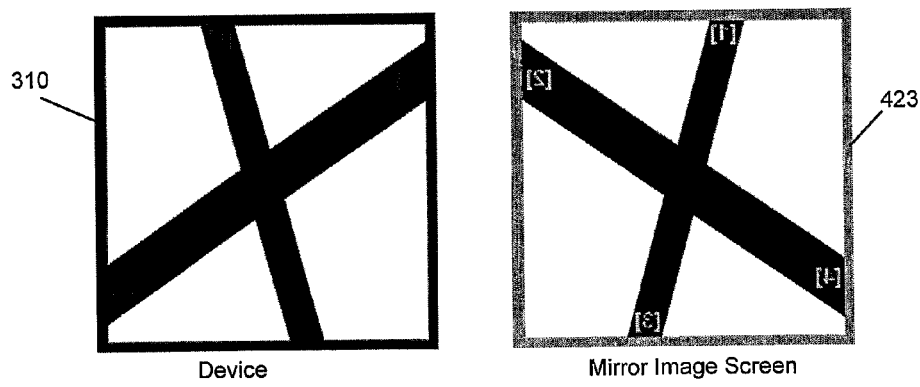

With some screen designs the screen 423 can be turned over providing an active mirror image of the correct decoder; this is the same as reversing the sign of the included angle as illustrated in FIG. 5B.

Figure 5C:
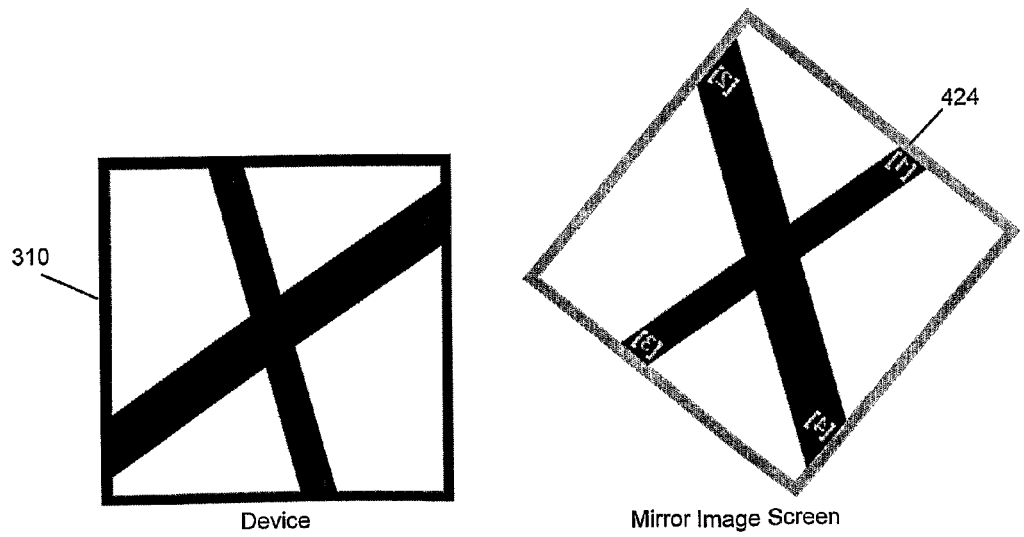

Rotating the mirror image screen 424 through 40° provides a false double conjunction as shown in FIG. 5C.

Of course in this case neither of the aligned lines are the correct width so no decoding occurs.

Figure 5D:
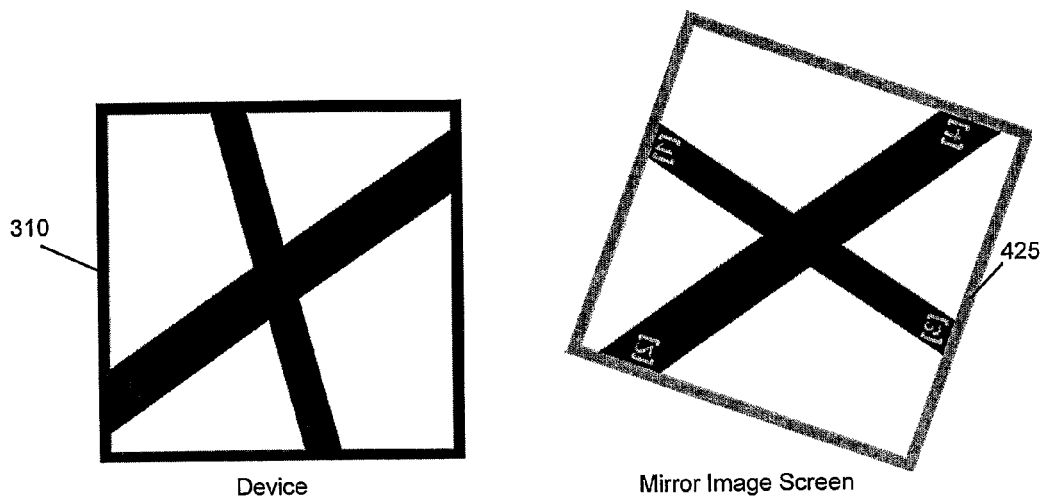

If the mirror image screen is rotated to 2(A−90)=2×(55−90)=−70° then the [2] [4] line in the decoder is aligned with the [2] [4] line in the device 310 as shown in FIG. 5D.

Figure 5E:
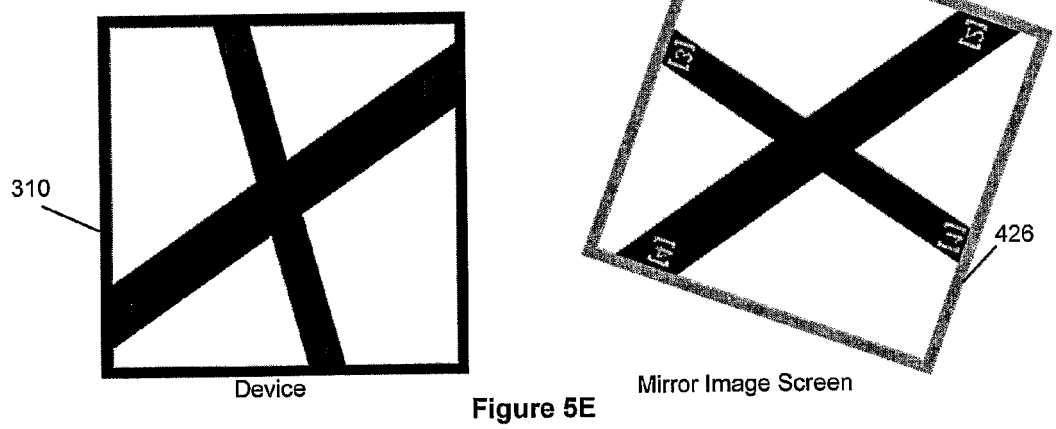

Consider the screen 426 rotated an additional 180° for a total of (180+(−70))=110° as shown in FIG. 5E.

These last two rotations will decode and invert only the hidden image associated with the phasegram utilising the [2] [4] lines.

Figure 5F:
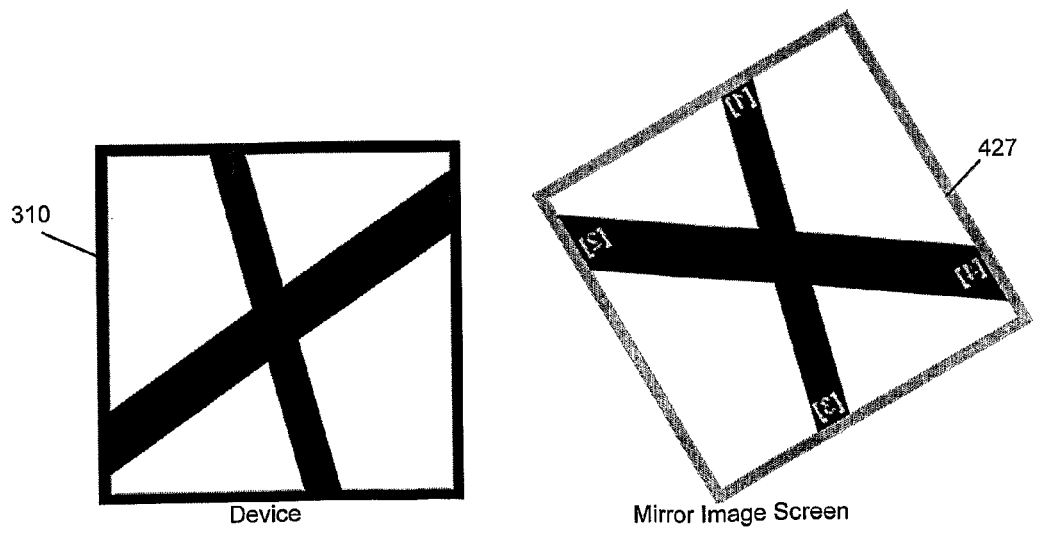

Similarly if the mirror image screen is rotated to 2B=2×(−15)=−30° then the [1] [3] line in the decoder is aligned with the [1] [3] line in the device as shown in FIG. 5F.

Figure 5G:
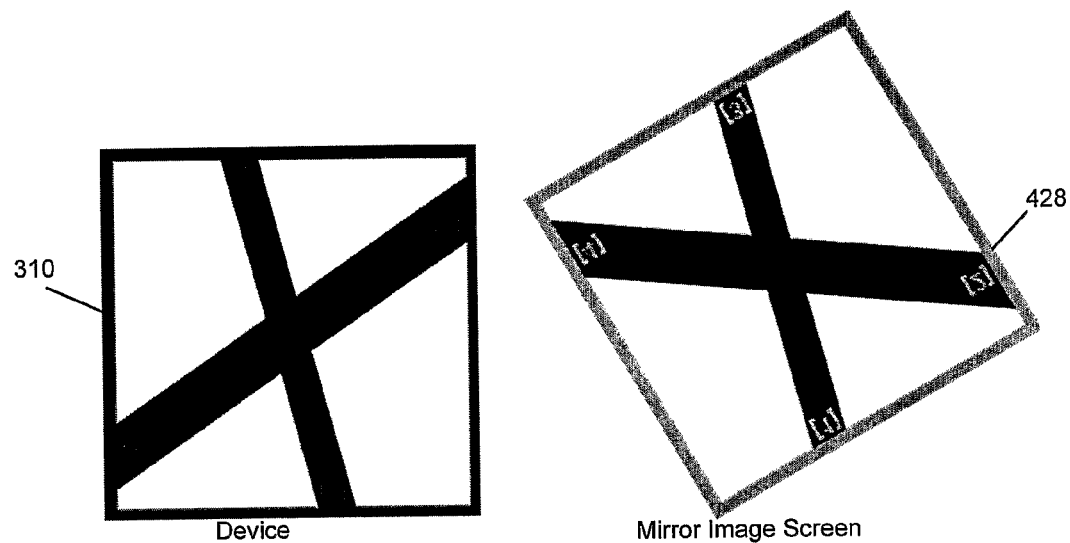

And again if the screen 428 is rotated an additional 180° for a total of (180+(−30))=150° as shown in FIG. 5G.

These last two rotations will decode and invert only the hidden image associated with the phasegram utilising the [1] [3] lines.

As a result it is impossible to decode both hidden images simultaneously when the screen is turned over requiring a rotation of at least 2(A−90)−2B=2×(55−90)−2×(−15)=−40° to switch from one image to the other.

Moreover it will be apparent from this analysis that the decoder image must have the same angle (both magnitude and sign) between the set of component lines as the L&K device to decode both images simultaneously. So if care is taken to provide a relationship between the images and simultaneous decoding is clearly prescribed then the angle between the lines becomes a unique defining characteristic of the decoding screen and the L&K device.

In summary this means that the L&K decoding screen will only decode both images, in the intended orientation, when it is positioned at the correct angle. If the screen is rotated 180 degrees both images will appear but the image on the screen will be inverted. If the screen is flipped it will be possible to rotate the screen to display either image but in no position will both images be decoded simultaneously.

Earlier hidden image devices could be decoded by a spurious screen of matching line width regardless of the screen angle used in its design by merely rotating the screen until decoding occurred. This is because the decoding screen and device were completely defined by the line width.

The definition of a unique angle or set of angles in the L&K device provides a variable that allows substantial expansion of the number of unique decoding images that can be produced. The combination of two line widths further expands the number of unique screens. For example with a simple phasegram, if 40 practical line widths are available, only 40 unique screens are possible. If two phasegrams are combined to make a simple dual phasegram L&K device and say there are 25 practical angle differences possible; the number of practical unique screens becomes 40×39×2 (sign)×25=78,000.

To provide all of the advantages discussed above the following constraints should be applied:
1. The line angles should be different in the component phasegrams.
2. The line widths should be different in the component phasegrams.
3. The line angles used should be selected to avoid 90° occurring between any two sets of lines.
4. The line angles used should be selected to avoid near 0° occurring between any two sets of lines. (Near Parallel to be Avoided.)

Some or all of these constraints can be deliberately abandoned if particular results are desired for certain applications.

Further Security Techniques

Non Integer Line Space

Figure 6:
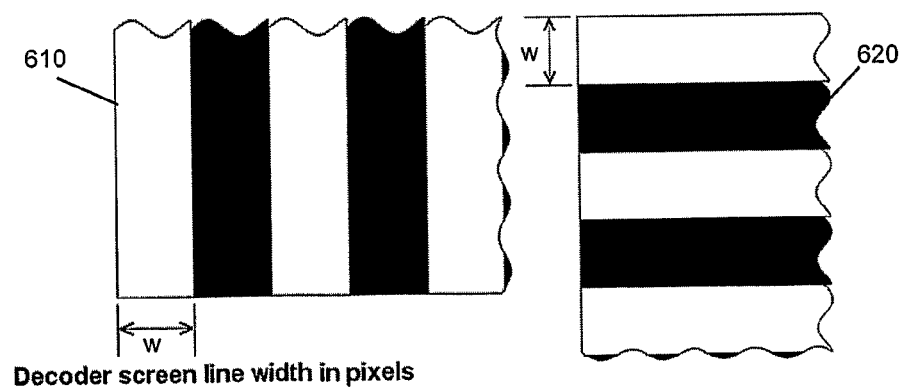
FIG. 6 shows a portion of a decoder.
Figure 7:
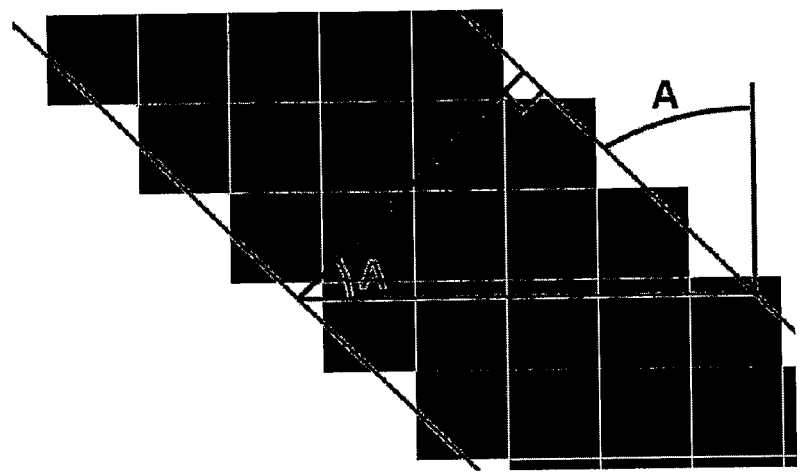
FIGS. 7 and 8 illustrate non-integer line widths.

Current decoder screen lines are typically vertical or horizontal lines with a width and spacing defined by an integer number (w) of pixels or printals as shown by the screens 610, 620 in FIG. 6. Persons skilled in the art will appreciate that this technique is suitable for combining with the above multiple hidden image techniques, can also be used in respect of single hidden images. An advantage of this technique is that it allows more distinct decoder screens to be created.

A problem with such screens is that they provide limited options to the designer of a security device as they only provide a limited set of possible screens where different screens are needed.

We have determined that it is possible to provide lines of non-integer width by varying the number of pixels used for the lines of the screen. The line width is therefore defined by an average of the number of pixels and both integers and non-integer decoders can be produced by averaging a number of integers close to the required line width.

Normally the desired image size, line width and angle are defined prior to the preparation of the phasegram so it is necessary to arrive at the required artwork by an algorithm. There are many ways this can be done here are two examples:
1. Using a Commercial Artwork Resealing Application or Algorithm:

An example will be used to demonstrate this method; let us say that an image 1000×1000 needs to be converted to a phasegram of the same size, 1000×1000 pixels. The desired phasegram array line width is 6.89 pixels and the line angle will be −33 degrees. This will be achieved by resealing a preliminary phasegram with lines 6 pixels wide to produce one with lines 6.89 pixels wide. The dimensions of the required preliminary phasegram are:

$$1000 \times 6/6.89 = \sim 870.827 \text{ pixels wide and high}$$

This is not practical to do exactly; digital images are constrained to use integer numbers of pixels to define the width and height. Therefore ~870.827 is rounded to 871, making the preliminary phasegram 871×871, when it is resealed back to 1000×1000 pixels the lines will become ~6.888634 pixels wide; for most work this may be an acceptable approximation.

A more accurate approach is to add a temporary border to the edges of the artwork to bring it to a dimension that can be divided exactly by 6.89: By multiplying 6.89 by 200 we get 1378; if a border 378 pixels wide is added to the right and bottom edges of the original artwork the preliminary phasegram dimensions become:

$$(1000+378) \times 6/6.89 = 1200 \text{ pixels wide and high}$$

After the border is added the starting image is resealed to 1200×1200 pixels using an image processing application or any existing resealing algorithm that produces good quality resealing (for example). This image is now processed to produce a phasegram by the methods described in WO 200500280. The average width is related to the line angle by the formula L=H Cos(A), as illustrated in FIG. 6. Thus, one way of achieving a non-integer line width is to select the line angle. In this case to achieve an average of 6.89, the line angle will be −33 degrees and the line width 6 pixels.

The phasegram is then resealed back to 1378×1378 pixels using an image processing application or existing resealing algorithm that produces good quality resealing.

Figure 8:
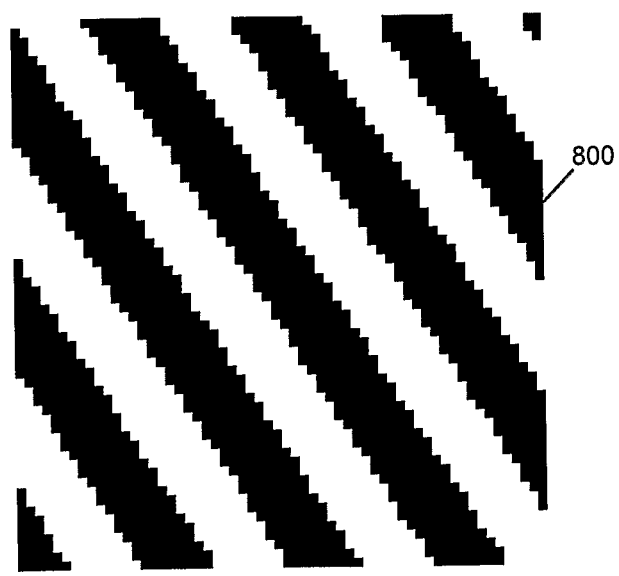

Then the border is trimmed off (removed) producing a 1000×1000 pixel phasegram. At this stage the phasegram typically contains a range of greys as a result of an anti-aliasing and rescaling algorithm, for printing purposes a phasegram has to be black and white, so a standard colour reduction algorithm is used to reduce the shade range to black and white as illustrated in FIG. 8.

This process replaces the grey pixels with either black or white pixels; the distribution of added black and white pixels provides an area average that simulates the original grey pixels. Overall the distribution of black and white pixels provides a screen 800 an average that simulates lines of the correct width, 6.89 pixels.

Figure 9:
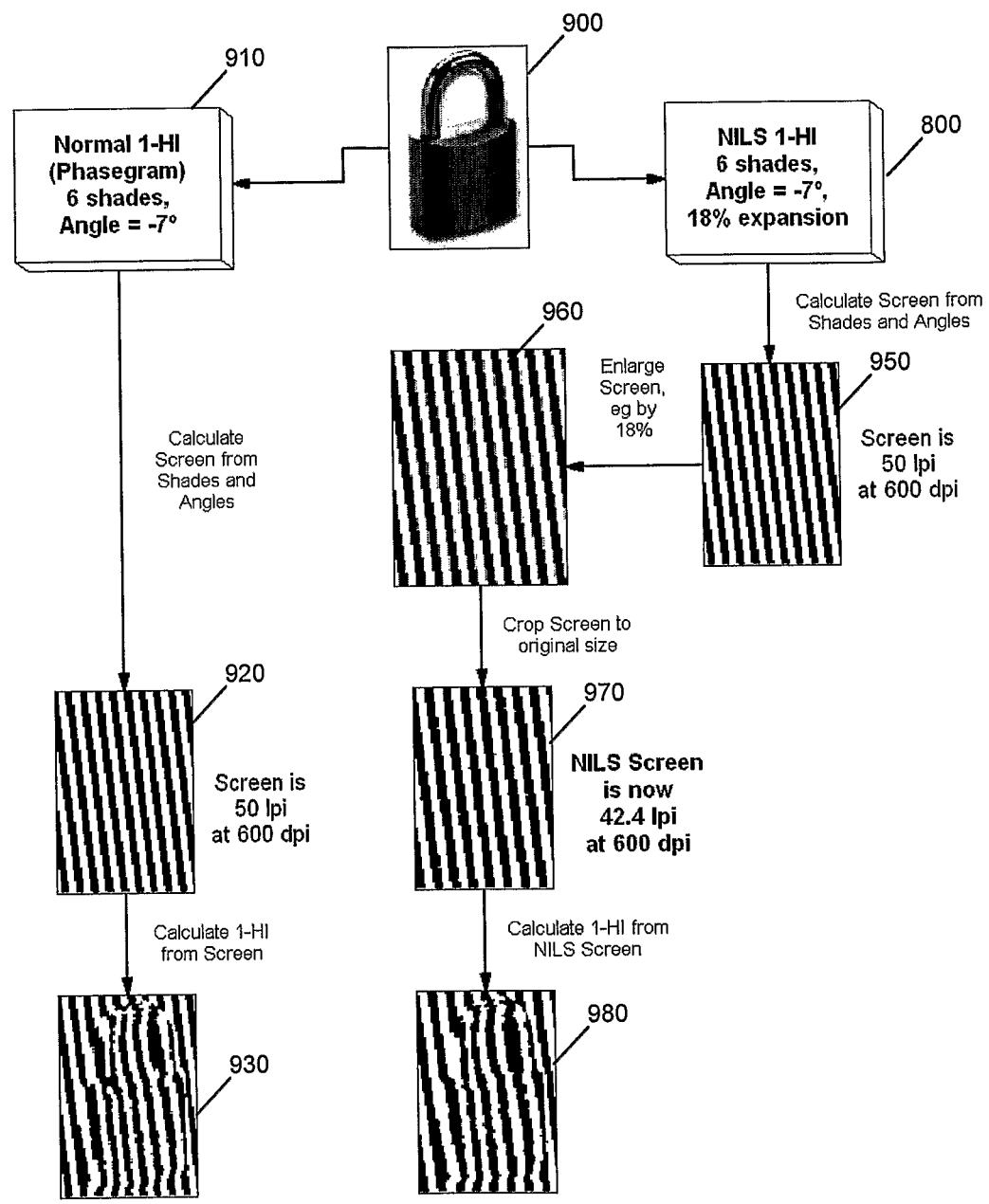
FIG. 9 is an example of forming a non-integer line width device.

This process is summarised in FIG. 9 which shows the normal process for an integer screen 910-930 as well as the process for a non-integer screen 940-980 from the same image 900.

In the normal process the base image 900, is determined to encode an image 900 of a lock. In the normal process, a phasegram with 6 different shades and an angle of 7° is chosen. The next step in the process is to calculate the screen from the number of shades in the chosen angle. The resultant screen is 50 lines per inch at 600 dots per inch 920. The phasegram is then calculated from the screen 930. In the alternative process it is decided to form a non-integer screen by applying an 18% expansion. Accordingly, the original screen is 50 lines per inch at 600 dpi 950 (i.e. equivalent to the screen 920). The screen is then enlarged by 18% 960 and cropped to the original size. The revised screen is now 42.4 lines per inch at 600 dots per inch which results in the production of a revised phasegram 980 which uses a non-integer screen width.

2. Implementation of a Direct Algorithm in Software:

In the literature several algorithms have been published that produce angled lines with an optimum distribution of the jagged steps. The optimisation is intended to provide the smoothest visual line possible. The best known of these is Bresenham's Line Algorithm. See for example, http://en.wikipedia.org/wiki/Bresenham's_line_algorithm http://www.research.ibm.com/journal/sj/041/ibmsjIVRIC.pdf To execute the Bresenham algorithm in software all that has to be provided are the start and finish co-ordinates of the required single pixel lines. Moreover these co-ordinates are not constrained to integer numbers of pixels in a generalised software implementation of the Bresenham algorithm.

The decoding mask can be produced by drawing a grouped sequence of parallel single pixel lines running at the required angle A. The number of single pixel lines in each group and the spacing between each group is selected to provide the L pixel wide black and white lines of the decoder screen. Consider the co-ordinates of the ends of each single pixel line as a series of [X1, Y1] and [X2, Y2]. To completely fill the decoder screen with lines all of these co-ordinates must lie on the edges of the required screen. Because of the line angle A the co-ordinates [X1, Y1] are related to [X2, Y2] by:

$$(X2-X1)/(Y1-Y2) = \text{Tan}(A)$$

L, A and H are related by:

$$H = L \text{ Sec}(A)$$

Notice that H represents the change in the X co-ordinates to traverse the full width of a single decoder line (usually the same for white and black). There is no requirement for integer values for either H or L (or A for that matter) but the number of single pixel lines in each group must be an integer. So we define the group size as G where G is the first integer greater than H.

To produce the full width black and white lines of the decoder the software will draw and count G black single pixel lines then skip G single pixel lines to produce the white. This sequence will be repeated to complete the decoder screen.

To ensure complete coverage and definition of the decoder lines it is important that the distance between consecutive single pixel lines has a maximum value of 1 pixel. As G>H we can set this step distance as:

$$S = H/G$$

So we can produce the decoder screen by stepping through values of X1, advancing by steps of S. Conventional programming tactics are used to avoid summation errors when implemented in practical software. For each value of X1 the corresponding values of Y1, X2, Y2 are determined or calculated and the corresponding single pixel line is drawn or skipped as required to produce the decoder black and white lines.

Further Improvements to the Decoders

Exploiting non-integer line widths allows a number of variations, for example, it is possible to vary:
1. line width
2. the angle (producing slightly curved or bent lines)
3. the phase
4. the mark space ratio Variations can also be made where lines cross traversing the decoder, for example, it is possible to vary:
5. the line width from line to line across the screen.
6. the angle from line to line across the screen.
7. the phase from line to line across the screen.
8. the mark space ratio from line to line across the screen.

Exemplary non-integer line widths allows screens composed of lines that are not the same thicknesses.

Figure 10:
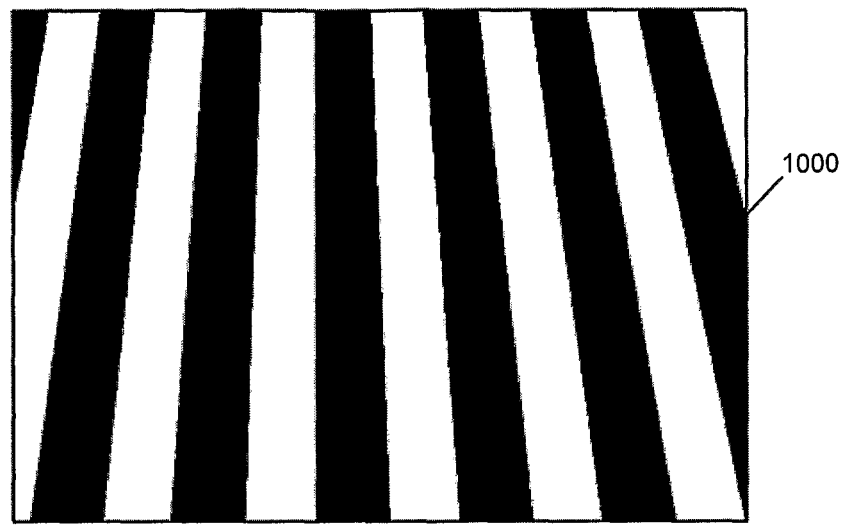
FIGS. 10, 11 and 12 are examples of screens with varying line widths.

In the screen 1000 of FIG. 10 the lines (and the gaps) are 6 pixels wide at the top, and 7 pixels at the bottom. In the middle, they are in between 6 and 7 pixels, eg: 6.5 pixels in the exact middle.

So if printed at say 1200 dpi, the top will have a frequency of 1200/(6+6)=100 lines per inch (lpi), while the bottom will have a frequency of 1200/(7+7)=85.71 lpi. In the middle the frequency will be somewhere between 85.71 and 100 lpi.

As a result no conventional screen with a fixed lpi/frequency can decode MDIs made using these screens.

Naturally, it is possible to implement many variations on this example like making the white/clear bands of constant width, and so on.

Figure 11:
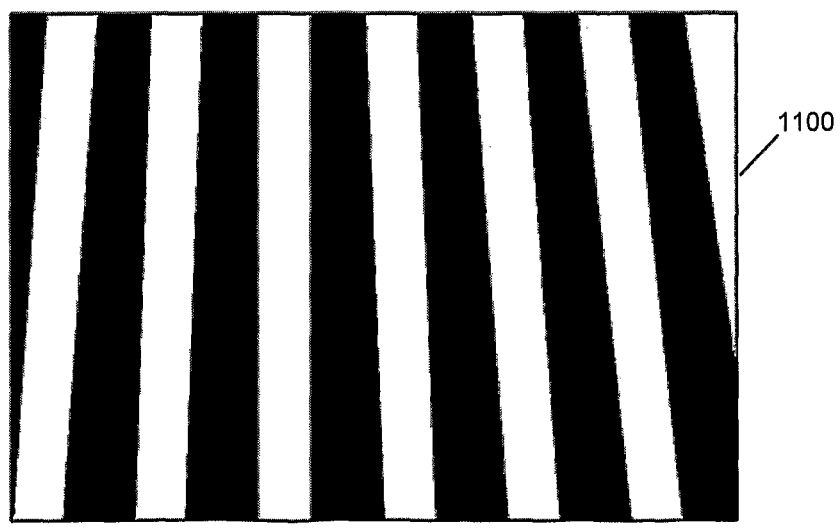

FIG. 11 shows on screen 1100 where white bands of constant width while the black bands vary.

Figure 12:
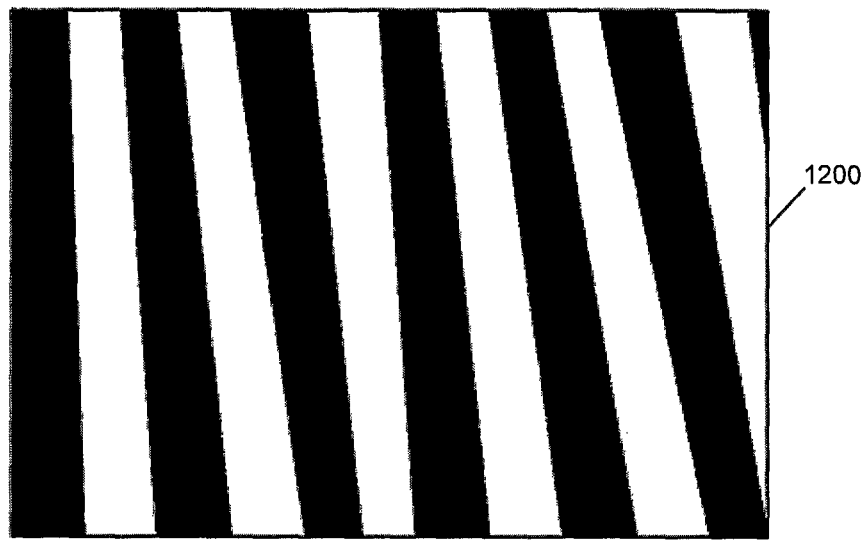

FIG. 12 shows a screen where some lines are "flipped" such that some expand from the bottom of the page to the top.

In summary, the advantage of such screens are:
They cannot be decoded by a conventional screen;
Immune to mathematical analysis (to deduce frequency and hence lpi and line width).
while their disadvantages are:
Computational difficulty (which is not great)
Slight loss of contrast in revealed image.

Figure 13:
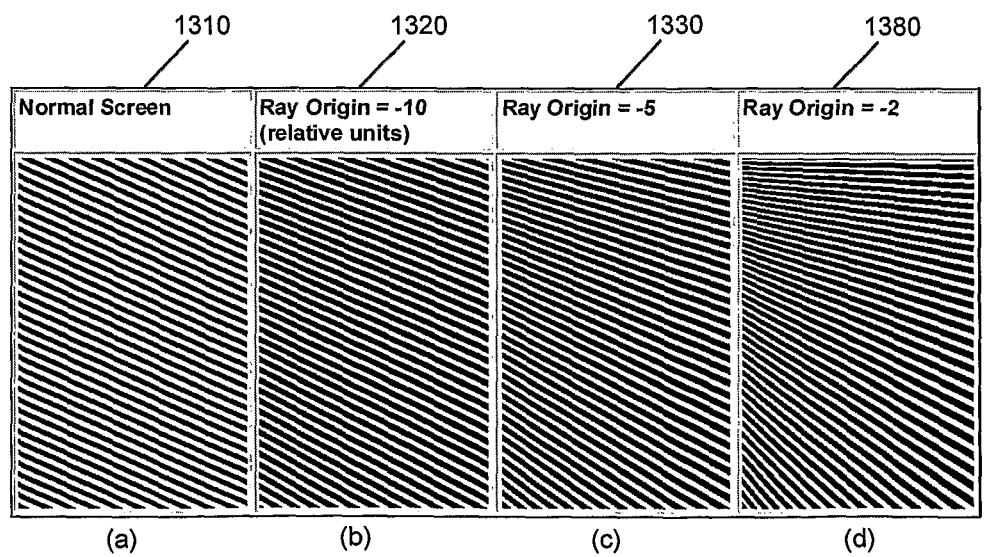
FIG. 13 illustrates examples of screens with diverging lines.
Figure 14:
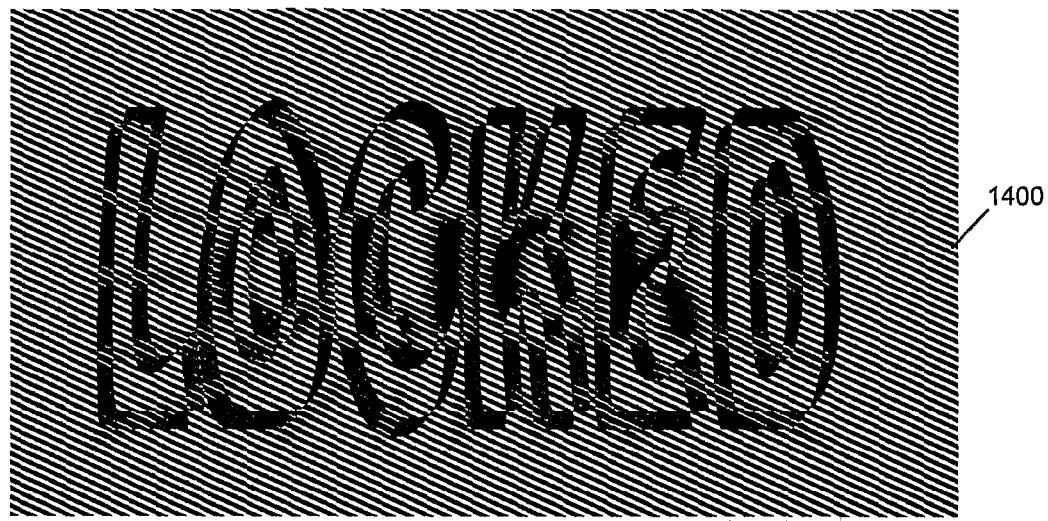
FIGS. 14, 15 and 16 show an example of a MIST device.

FIG. 13 shows three screens 1320, 1330, 1340 which are ray-traced from a point outside the screen, but all have the same notional angle and line thickness compared to a normal screen 1310.

These screens have a distribution of angles and line thicknesses. The angle and line thickness may be set at the centre of the screen, and then both the angles and line thicknesses vary as you move away from the centre. In an alternative the angle and thickness are set at the top-left corner. Setting the angle and thickness in the centre makes comparison with a normal screen easier.

Masked Information Screen Technology (MIST)

To produce a MIST device we define two or more concurrent and similarly shaped areas in a conventional but conceptual decoding screen and phasegram; then change the parameters defining both the screen and phasegram such that each area has a unique characteristic compared to surrounding areas. When this is done and produced as a physical device, correct decoding of the hidden image will only occur only when all the areas in the decoding screen are aligned with the correct areas in the phasegram. The parameters in this case can include one, all or any combination of line width, line angle, line phase or function.

(a) Line Width—Normal line width parameter as defined for conventional phasegrams.
(b) Line Angle—Normal line angle parameter as defined for conventional phasegrams. In this case the angle is highly relevant as simple rotation of a screen with the wrong angle but correct line width may partially decode but will not permit alignment of the MIST image or images.
(c) Line Phase—now becomes a defining characteristic of the decoding screen as well as providing grey levels. If two areas differ in phase then correct decoding will only occur when the screen is in the correct phase position and the MIST images are aligned.
(d) Function—by function we refer to the particular area either being a section of phasegram or a section of decoder screen.

When a MIST device is not quite perfectly aligned an image 410 of the mask used is visible as an apparent relief image—i.e. a 2 dimensional image provided drawn shadows to appear 3 dimensional as ill.

Figure 15:
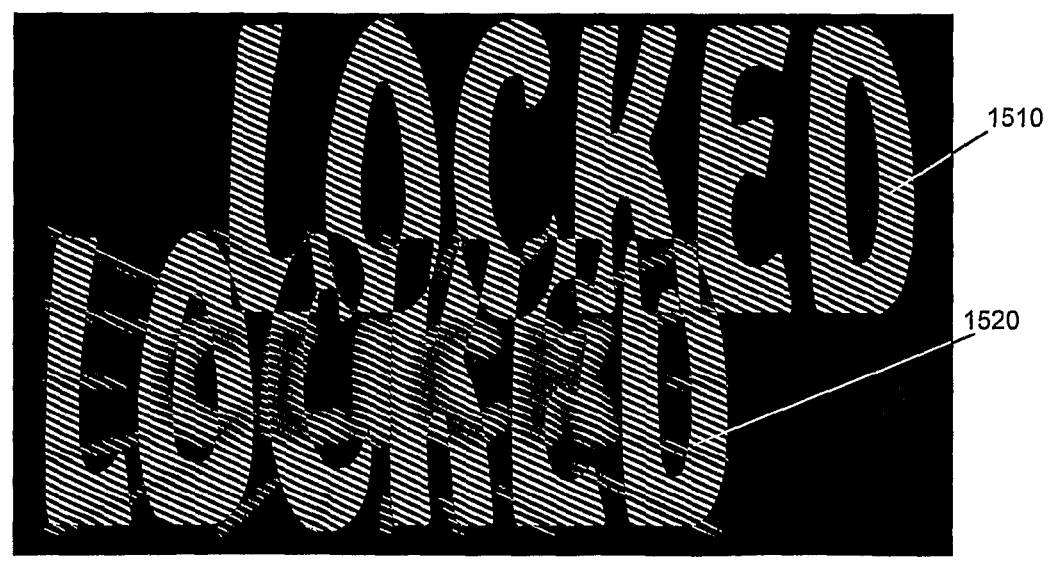

When the MIST device is perfectly unaligned two images 1510,1520 of the mask can appear as shown in FIG. 15.

Figure 16:
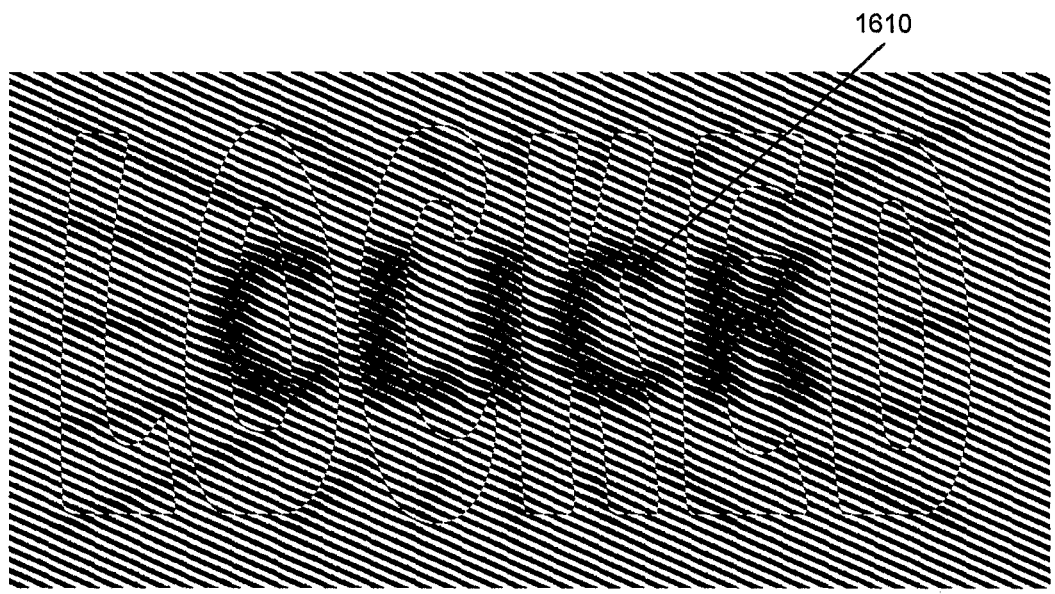

For the best concealment the mask or masks used for the MIST image or images should be chosen to roughly equally divide the total area of the device and interact with the total area in as complex a pattern as possible; if this is done the hidden image is almost completely concealed until complete alignment of the MIST areas are made. If perfect alignment of the MIST images is made the MIST images will disappear leaving just the decoded image. This can provide a rapid and highly localised switch from one image to another as shown in FIG. 16 to decode image 1610.

Although the description to this point refers to the selection of the modified areas by means of a mask other methods could be used to select the areas such as algorithmic, random, tiling, linear bisection or direct inference from a pattern or image.

For the example MIST preparations to follow the area selection procedure will not be mentioned as it is simplistic and similar for each method. Only methods for MIST via Function Exchange and Phase Change will be shown here as persons skilled in the art will appreciate MIST via line width and angle are trivial variations of these procedures.

1. MIST Via Exchange of Decoder Screen and Phasegram Function:

The electronic files for a phasegram and its decoding screen are produced in the normal way. Then the areas to be exchanged are cut from the screen and phasegram using normal image processing techniques well known to the art. The cut areas from the screen are then exchanged with those from the phasegram. Then the exchanged cut areas are restored to the relevant areas in the screen and phasegram.

In this way the decoding screen will contain some portions of the phasegram and the phasegram will contain some portions of the decoding screen. When the phasegram and decoding screen are produced as physical devices the decoding screen will be uniquely connected to the particular phasegram and will only decode correctly when the exchanged portions are perfectly aligned. This works because the phasegram produces images from the difference in phase of the screen and phasegram elements. A natural consequence of this is that both components can be exchanged in function.

2. MIST Via Change of Phase—Complete Phase Inversion:

The electronic files for a phasegram and its decoding screen are produced in the normal way. In both the decoding screen and the phasegram, the areas to be phase inverted are converted to negatives; i.e. all black is replaced with white and all white is replaced with black. This is exactly the same as rotating the phase of the defined areas by one line width.

Unlike the previous example the decoding screen will not contain portions of the phasegram; both the screen and the phasegram still retain their original function. The only unique connection shared is the shape of the shifted areas in both screen and phasegram.

When the phasegram and decoding screen are produced as physical devices the decoding screen will again only decode correctly when the inverted portions are perfectly aligned.

3. MIST Via Change of Phase—Variable Phase Change:

(This method is very general and could equally apply to line width, line angle or various combinations of parameter changes.)

Two sets of electronic files for phasegrams and decoding screens are produced in the normal way. The two sets contain the same hidden image or images but differ in the phase required for correct decoding of the hidden images. In both the decoding screens and the phasegrams the areas to be phase shifted are cut using normal image processing techniques well known to the art. The cut areas from the two screens are then exchanged and the cut areas from the two phasegrams are exchanged. Then the exchanged cut areas are restored to the relevant areas in the screens and phasegrams. Only one set of the resulting screens and phasegrams is used.

In this way the chosen decoding screen will contain some portions of the other decoding screen and the chosen phasegram will contain some portions of the other phasegram. When the phasegram and decoding screen are produced as physical devices the decoding screen will be uniquely connected to the particular phasegram and will only decode correctly when the MIST areas are perfectly aligned.

Synergies

Unique characteristics of the various latent image technologies allow synergistic effects to occur in suitably designed devices combining one or more form of latent images.

Localised Event Triggering (LET)

The Lock and Key device has a characteristic that allows two decoded hidden images to appear to be moving with respect to each other. This effect allows novel alignments of two images some examples are mentioned here:

An image of a rider can be placed on an image of a horse;
The images of two hands can be brought together as in a hand shake;
An image of a key can be placed in an image of a lock;
Every second letter of a word or serial number can be interleaved and aligned with every first letter or number so the complete word or serial number can be read; and
An image of a driver in an image of a car. Etc The MIST device has a characteristic that provides a rapid highly localised change from one visible image to another. If we use the alignment of images in the L&K to provide a guide to exactly align the MIST device we can provide a synergistic effect when the events coincide. For example:

When the image of a key goes in the image of a lock the visible mask outline of the word "locked" can become "click";
When an image of a finger goes on a button on a TV image an image could appear on the TV; and
When an image of a match is applied to an image of a candle the image of flame appears. Etc.

Animation while Aligning

An anigram can be designed to interact with a phasegram decoding screen so that if both the anigram(s) and phasegram are printed close together while the screen is being aligned on the same phasegram the anigram will animate. Further details of the production of an anigram can be found in PCT/AU2003/001331, the disclosure of which is incorporated herein by reference.

Animated Phasegram

If the two images from a two image animation sequence are encoded in the same position as a left moving phasegram and a right moving phasegram a unique hidden image is produced; wherein the two sequential images can be decoded alternately by sliding the decoding screen backwards and forwards across the phasegram RL pair producing a primitive animation effect.

Animated Sequence in a Multiple Phasegram

If 3 images from a three image animation sequence are encoded in the same position as a standard 3 hidden image phasegram with the same line width used for each image but different angles. Then if the decoding screen is rotated around a point the hidden images will appear in sequence.

Easily Decoded Latent Image

As was mentioned above personalisation the MIST image is visible when the images are unaligned. This is a consequence of the formation of moiré patterns between the unaligned screens. Because the moiré patterns are different in the adjacent areas making up the MIST, the image of the MIST mask becomes visible. Moreover this image does not require the accurate alignment usually noted with typical phasegram devices. Based on this concept one could produce an easily decoded MDI by simply changing the screen parameters in localised areas of a simple line screen. The localised areas would conform to some sort of recognisable image or text message etc. Then a simple line screen would reveal the image regardless of where it is positioned or how it is orientated.

Exemplary Computing System

Figure 17:
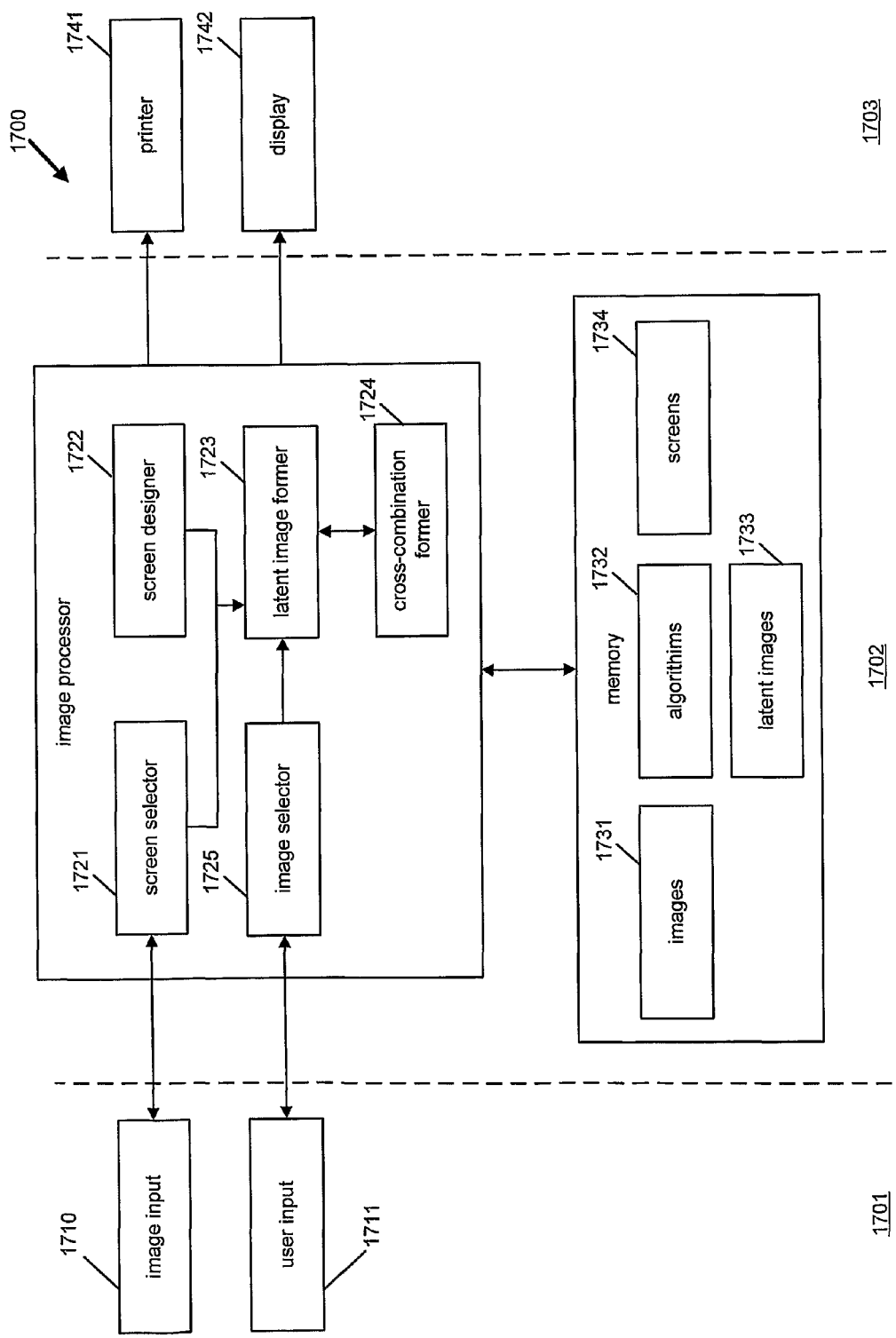
FIG. 17 shows an exemplary computing system.

FIG. 17 shows an exemplary computing system 1700. The computing system can be implemented using program code executed by a processor. Such software can be designed by persons skilled in the art. The computing system 1700 comprises an input section 1701 and image processing section 1702 and an output section 1703.

The image input section 1701 comprises an image input 1710 which may be for example, a camera to capture images to be processed. The input section may also allow the user to supply images from other sources, for example from data supplied to the image processing section 1702. The user input 1711 would typically be in the format of a keyboard and/or pointing device that allows the user to input parameters for the process.

The image processing section 1702 includes functions for allowing the user to select screens 1721 stored in memory 1730 as screen data 1734 or design screens 1722 by inputting the parameters of a design screen.

Image selector 1725 allows the user to select to obtain an image from the image input 1710 or from memory 1730 stored as image data to be used to form the image by the latent image former 1723. The latent image former 1723 is arranged to allow the user to select the algorithm, for example a phasegram algorithm, from memory 1730 stored as algorithm data 1732 for application in forming of the latent images. The latent image former 1723 is arranged to allow the user to form a number of latent images, so that they can be cross combined by the cross combination former 1724. In this respect, the latent image former 1723 is arranged to store latent images as the latent image data 1733. In other embodiments, the user may choose to select latent images that are already stored in the memory 1730 for cross combination 1724 and by-pass the early steps of forming the latent image. The image output section 1703 includes a display 1742 to enable the user to view works in progress. The output section 1703 can also include other devices for example a printer 1741 to render the images as image carriers on transparent or non-transparent substrates.

The above techniques can be applied on an appropriate substrate in a wide range of application including as security devices for example to prevent anti-counterfeiting. Such techniques can be employed for example in relation to items such as tickets, passports, licences, currency postal media, credit cards, identification cards, negotiable instruments, bank cheques, traveller's cheques, labels, birth certificates, vehicle registration papers, land deed titles and visas. Novelty applications, such as for novelty items, advertising, toys, books or the like are also possible.

It will be understood to persons skilled in the art of the invention that many modifications may be made without departing from the spirit and scope of the invention, in particular persons skilled in the art will appreciate that features of the above embodiments and examples may be combined to form further embodiments. Further, some features of the above embodiments can be employed independently of others.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A hidden image method comprising forming a set of carrier devices which when overlayed upon one another and aligned will reveal N images within a common area, the set of carrier devices being formed by:
    forming N latent images from respective ones of the N images and respective ones of N line decoders to hide the N images, each latent image being decodeable by the decoder from which the latent image is formed to reveal the image the latent image hides, the N latent images further formed such that the lines of the decoders cross one another within the common area at line angles displaced relative to one another so as to define a single axis of alignment; and
    forming each carrier device of the set of carrier devices by combining at least two items selected from the set of latent images and decoders so as not to decode any of the hidden images and such that the set of carrier devices includes all the latent images and all the decoders, whereby the set of carrier devices will reveal the N hidden images within the common area when overlayed upon one another and aligned.

2. A hidden image method as claimed in claim 1, wherein each line decoder has an average line width sufficiently different to the line widths of each other decoder so as to decode a single one of the hidden images.

3. A hidden image method as claimed in claim 1, comprising forming each carrier device by combining at least one latent image and at least one decoder.

4. A hidden image method as claimed in claim 3, wherein each carrier device consists of one latent image and one decoder.

5. A hidden image method as claimed in claim 1, wherein each line of at least one decoder is at the same angle relative to the common area.

6. A hidden image method as claimed in claim 1, wherein at least some lines of at least one decoder are different angles relative to the common area.

7. A hidden image method as claimed in claim 1, wherein at least some lines of at least one decoder vary in width.

8. A hidden image method as claimed in claim 1, wherein the lines of at least one decoder are of constant width.

9. A hidden image method as claimed in claim 1, wherein N is 2.

10. A method as claimed in claim 1 comprising selecting the hidden images so as to define a single correct orientation relative to the axis of alignment when the hidden images are revealed by decoding.

11. A method as claimed in claim 1, at least one of the carrier devices carries a further hidden image arranged so as to decode when the carrier devices are in register such that each of the hidden images and the further hidden image are concurrently revealed.

12. A method as claimed in claim 11, wherein the further hidden image is formed by modifying corresponding portions of two carrier devices.

13. A method as claimed in claim 12, wherein the portions are modified by modifying at least one parameter of the image carriers.

14. A method as claimed in claim 13, wherein the modified parameter is one or more of:
    line width;
    line angle;
    line phase; and
    function as image carrier or image decoder.

15. A method as claimed in claim 1, wherein at least one of the decoders has a line width which is a non-integer number of pixels.

16. A hidden image apparatus comprising:
    a set of carrier devices which when overlayed upon one another and aligned will reveal N images within a common area, the set of carrier devices comprising N latent images and N line decoders, the N latent images formed from respective ones of the N images and respective ones of N line decoders, each latent image being decodeable by the decoder from which it is formed to reveal the hidden image, the N latent images further formed such that the lines of the decoders cross one another at relative line angles so as to define a single axis of alignment within the common area, and
    each carrier device of the set of carrier devices formed by combining at least two items selected from the set of latent images and decoders so as not to decode any of the hidden images and such that the set of carrier devices include all the latent images and all the decoders between them, whereby the set of carrier devices will reveal the N hidden images within the common area when overlayed upon one another and aligned.

17. A computer system arranged to implement a hidden image method comprising forming a set of carrier devices which when overlayed upon one another and aligned will reveal N images within a common area, the computer system comprising:
    a processor configured to:
        receive image data indicative of the N images; and
        form the set of carrier devices by:

forming N latent images from respective ones of the N images and respective ones of N line decoders to hide the N images, each latent image being decodeable by the decoder from which the latent image is formed to reveal the image the latent image hides, the N latent images further formed such that the lines of the decoders cross one another within the common area at line angles displaced relative to one another so as to define a single axis of alignment; and forming each carrier device of the set of carrier devices by combining at least two items selected from the set of latent images and decoders so as not to decode any of the hidden images and such that the set of carrier devices includes all the latent images and all the decoders, whereby the set of carrier devices will reveal the N hidden images within the common area when overlayed upon one another and aligned.

18. A non-transitory computer readable medium comprising computer program code which when executed by a computer system implements a hidden image method, the hidden image method comprising forming a set of carrier devices which when overlayed upon one another and aligned will reveal N images within a common area, the set of carrier devices being formed by:

forming N latent images from respective ones of the N images and respective ones of N line decoders to hide the N images, each latent image being decodeable by the decoder from which the latent image is formed to reveal the image the latent image hides, the N latent images further formed such that the lines of the decoders cross one another within the common area at line angles displaced relative to one another so as to define a single axis of alignment; and forming each carrier device of the set of carrier devices by combining at least two items selected from the set of latent images and decoders so as not to decode any of the hidden images and such that the set of carrier devices includes all the latent images and all the decoders, whereby the set of carrier devices will reveal the N hidden images within the common area when overlayed upon one another and aligned.

* * * * *